United States Patent [19]
Tomida

[11] Patent Number: 5,344,476
[45] Date of Patent: Sep. 6, 1994

[54] METHOD FOR FORMING AN OPTICAL ELEMENT

[75] Inventor: Masayuki Tomida, Yokohama, Japan

[73] Assignee: Canon Kabushiki Kaisha, Tokyo, Japan

[21] Appl. No.: 52,280

[22] Filed: Apr. 26, 1993

Related U.S. Application Data

[63] Continuation of Ser. No. 813,282, Dec. 20, 1991, abandoned.

[30] Foreign Application Priority Data

Dec. 21, 1990 [JP] Japan .................. 2-412790

[51] Int. Cl.⁵ .............................. C03B 23/00
[52] U.S. Cl. ........................... 65/102; 65/64; 65/162; 65/275
[58] Field of Search .............. 65/64, 102, 275, 162

[56] References Cited

FOREIGN PATENT DOCUMENTS 118644  6/1985  Japan ..................... 65/102

Primary Examiner—Joye L. Woodard
Attorney, Agent, or Firm—Fitzpatrick, Cella, Harper & Scinto

[57] ABSTRACT

An improved method of forming an optical element, wherein heated upper and lower molds are used in conjunction with radiation heating glass material placed in an optical forming surface of the lower mold. The molds are heated to a necessary temperature, then the glass material is heated by exposure to heat by radiation. The glass blank then is pressed between the upper and lower molds to transfer the optical forming surfaces of each mold to the glass material, and define the optically functional surfaces of an optical element.

2 Claims, 5 Drawing Sheets

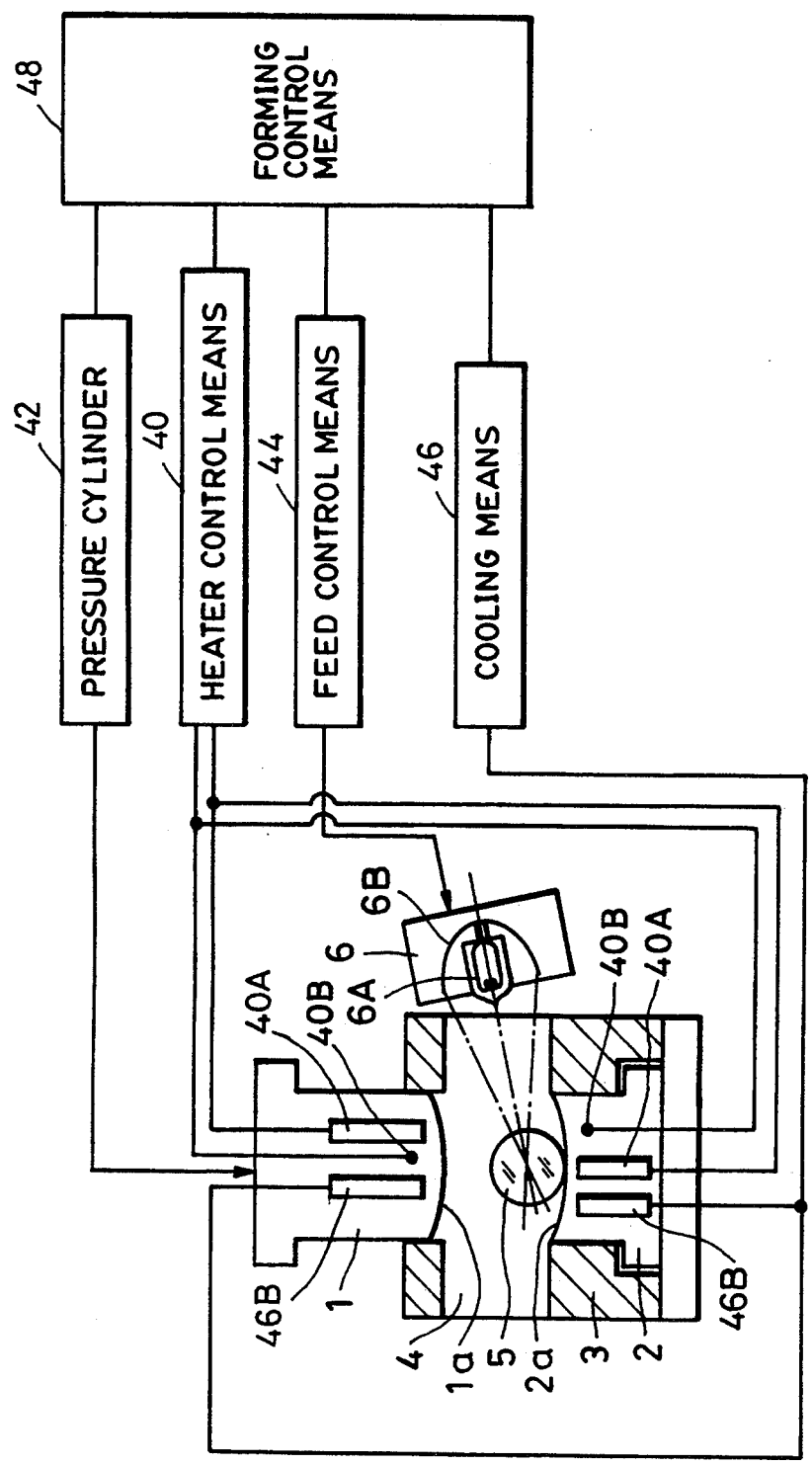
FIG. IC

ASPHERICAL PORTION

METHOD FOR FORMING AN OPTICAL ELEMENT

This application is a continuation of application Ser. No. 07/813,282 filed Dec. 20, 1991, now abandoned.

BACKGROUND OF THE INVENTION

1. Field of the Invention

This invention relates to a method and apparatus for forming an optical element wherein a glass material softened by heating is subjected to press forming by a pair of upper and lower forming molds.

2. Description of the Prior Art

Recently, a method of processing an optical element, herein a glass material (glass blank) softened by heating and subjected to press forming by a pair of tipper and lower forming molds has attracted attention over the previous method, where a glass material is ground and polished.

An explanation will now be provided of a conventional press forming method with reference to FIG. 5. In this method, a glass material 15 has previously been provided in a shape close to that of a formed final product. When performing press forming, the central portions of the glass material 15 contact the forming surfaces of the upper and lower forming molds. The upper mold 11 is removed from the apparatus, which is located in a heating furnace, then the glass material 15 is placed on a lower mold 12 and the upper mold 11 is set on the glass material 15. The entire apparatus is heated in the heating furnace at a temperature corresponding to a viscosity of the glass material 15 with which the glass material 15 can be formed. In this heating operation, the glass material 15 is heated by heat conduction from the upper and lower molds 11 and 12, and heat radiation from a cylindrical mold 13. In this case, since the radii of curvature of the forming surfaces 11a and 12a are similar to the radii of curvature of the surfaces of the glass material 15, and because gaps between the forming surfaces and the surfaces of the glass material 15 are small, excellent heat conduction is provided. Hence, the temperatures of the respective surfaces of the glass material 15 being formed are close to the temperatures of the corresponding upper and lower molds 1 and 2 and cylindrical mold 3.

As another conventional example, a spherical glass material is press formed as shown in FIG. 6. Such a shape can often be used when the size of a formed product, serving as an optical element, is small. In this case, since the distances between the respective surfaces of the glass material 25 to be formed, and the corresponding forming surfaces of the forming molds are large, heat conduction to the spherical glass material 25 is inferior to heat conduction when a glass material having a shape close to that of a final formed product is used. Even in this case, however, if a cavity made by the molds comprises a closed space, the glass material 25 can be heated to a temperature wherein the glass material 25 can be subjected to press forming by heat conduction and heat radiation from the molds.

However, the above-described method wherein a glass material having a shape close to that of a mold is used has the disadvantage of a high processing cost because of the costly glass material used. On the other hand, the use of a spherical blank can reduce the cost of the glass material to less than one tenth. Hence, it is desirable to perform press forming from a spherical glass material or a less expensive glass gob (a glass block obtained by cutting a fused glass stream) irrespective of the size of a formed product.

Recently, in order to shorten the forming cycle, apparatuses have been developed that place a glass material within a high-temperature forming mold that is located in an atmospheric furnace of a forming machine by using an automatic hand after press forming, a formed product is taken out from within the forming mold by the automatic hand, while the product is still at a high temperature of about 500 degrees. In this case, as shown in FIG. 7, it is necessary to provide an opening 34 for receiving an automatic hand 39 in a cylindrical mold 33. The presence of the opening 34 reduces heat radiation from the cylindrical mold 33 to the glass material, and obstructs the temperature rise of the glass material because heat is dissipated from the glass material through the opening 4.

As described above, it is preferable to use a spherical glass material and to handle the material with an automatic hand from the viewpoint of cost reduction. Such an approach, however, has the above-described problems. The problems will be sequentially explained with reference to FIG. 8. Since the heat transfer from the forming molds to a spherical glass material 25 is poor and because heat is radiated from the surface of the glass material 25, the temperature rise of the surface of the glass material 25 is significantly impeded. If press forming is performed in this state, the glass material 25 is deformed only slightly because the surface temperature of the glass material 25 is low. The contact areas between the glass material 25 and the forming molds increase due to this slight deformation, whereby heat conduction is increased. Hence, the surface temperature of the glass material 25 increases at the contact portion, causing a slight acceleration in deformation. Although it is possible to perform press forming by repeating the above-described process, a long time is needed for forming, particularly when a large glass material is used. Hence, such an approach is not practical. Furthermore, if press forming of such a low-temperature glass material is repeatedly performed, central portions of the forming surfaces of the forming molds, where high precision is required, are in some cases deformed. In order to provide a glass temperature suitable for forming, the temperature of the forming mold may be increased. In this case, however, since the temperature of the forming molds becomes higher than necessary, fusion may occur at the contact portion between the glass material and the forming molds during forming.

SUMMARY OF THE INVENTION

It is an object of the present invention to solve the above-described problems in the prior art.

It is another object of the present invention to provide a method and apparatus for forming an optical element wherein external radiation heat is provided to a glass material placed on a lower mold that avoids thermal influence on the forming yet is able to heat and soften the glass material at a desired temperature.

It is still another object of the present invention to provide a method of forming an optical element, such as a lens or the like, by heating and pressing a glass material wherein the glass material is not heated before placing it in molds (upper and lower molds) for forming, but is heated after placing the glass material in the molds. The glass material is then subjected to press forming.

It is yet another object of the present invention to provide a forming method and an apparatus suitable for forming an optical lens, particularly an aspherical lens wherein at least one of the optical functional surfaces of the lens comprises an aspherical surface.

These and other objects are accomplished, according to one aspect of the present invention, by a method for forming an optical element comprised of a number of steps. First, a glass material is placed on a lower mold of a pair of forming molds heated at a necessary temperature. Secondly, press forming of the glass material between the upper and lower molds occurs, to transfer forming surfaces of the forming molds to the glass material as optical functional surfaces of the optical element. However, before press forming, the glass material is heated and softened using radiational heat from a glass material heating means other than a heater for heating the forming molds. Press forming is performed after the temperature of the glass material has been raised to a desired temperature.

Another aspect of the present invention relates to an apparatus for forming an optical element comprising a pair of upper and lower forming molds, and a heater for heating the forming molds to a necessary temperature, further comprising a glass material heating means other than the above-described heater so that the glass material on the lower mold is heated and softened at a desired temperature by radiation heat before performing press forming.

BRIEF DESCRIPTION OF THE DRAWINGS

FIG. 1C is a diagram illustrating the configuration of a forming apparatus of the present invention;

DETAILED DESCRIPTION OF THE PREFERRED EMBODIMENTS

Figure 1A:
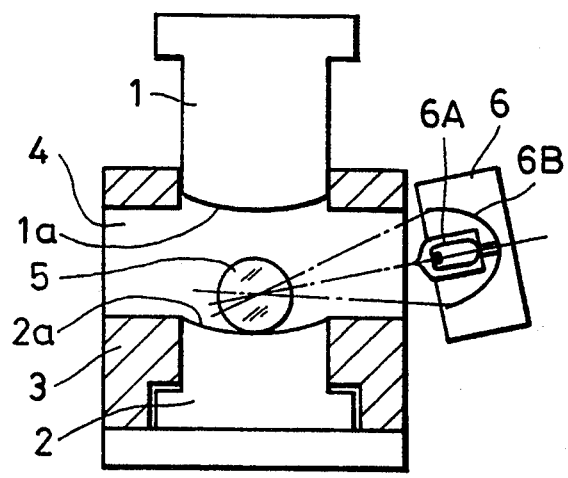
FIG. 1A is a vertical cross-sectional view of a mold structure according to an embodiment of the present invention.

An explanation will now be provided of a method and apparatus for forming an optical element according to an embodiment of the present invention with reference to the drawings. FIG. 1 shows an apparatus for forming an optical element according to the first embodiment. In FIG. 1, there are shown an upper mold 1 and a lower mold 2. A cylindrical mold 3 has a function of guiding the pair of upper and lower forming molds and a heating function. An opening 4 is formed in the cylindrical mold 3 for receiving an automatic hand (not shown) for handling a glass material and a formed product. A spherically polished glass material 5 to be subjected to press forming in the forming apparatus is placed on the forming surface of the lower mold 2 using the automatic hand, and is heated before press forming by radiation heat from a heating means 6 for glass material. In the present embodiment, the heating means 6 comprises a halogen lamp 6A and a reflecting mirror 6B having an ellipsoidal surface of revolution.

An explanation will now be provided for a method of forming an optical element of the present invention using the apparatus having the above-described structure. First, the upper and lower molds 1 and 2 are heated, by a heater within the cylindrical mold (not shown), to a temperature suitable for forming, for example, a temperature corresponding to the viscosity of the glass material 5 of $10^8$–$10^{11}$ poise, by a heater (not shown) provided within the cylindrical mold 3. Subsequently, an automatic hand moves the spherical glass material 5 into the space between the forming molds by passing through the opening 4 in the cylindrical mold 3 and then places it on the lower mold 2. At that time, the temperature of the glass material 5 is lower than its transition temperature. Subsequently, the halogen lamp 6A of the heating means 6 for glass material is lit. Infrared rays generated from the lamp 6A are reflected by the reflecting mirror 6B having the ellipsoidal surface of revolution, and are condensed onto the spherical glass material 5 to heat it. When the temperature of the glass material 5 has reached a temperature suitable for forming, for example, a temperature corresponding to the viscosity of the glass material 5 of $10^8$–$10^{13}$ poise, the upper mold 1 is lowered, and the glass material 5 is subjected to press forming. The output power of the halogen lamp 6A is gradually reduced in accordance with the start of contact between the upper mold 1 and the glass material 5, and is reduced to zero when forming has been completed. During this period, the upper and lower molds 1 and 2 in the course of press forming maintain a temperature optimum for forming. This is achieved by controlling the heater within the cylindrical mold 3.

The process of press forming after placing the glass material 5 on the lower mold 2 and heating the glass material 5 by the heating means 6, and the use of an automatic hand to place the glass material 5 and to take the formed product out allow the final formed product to be produced from the spherical glass material 5 in a short time.

Figure 1B:
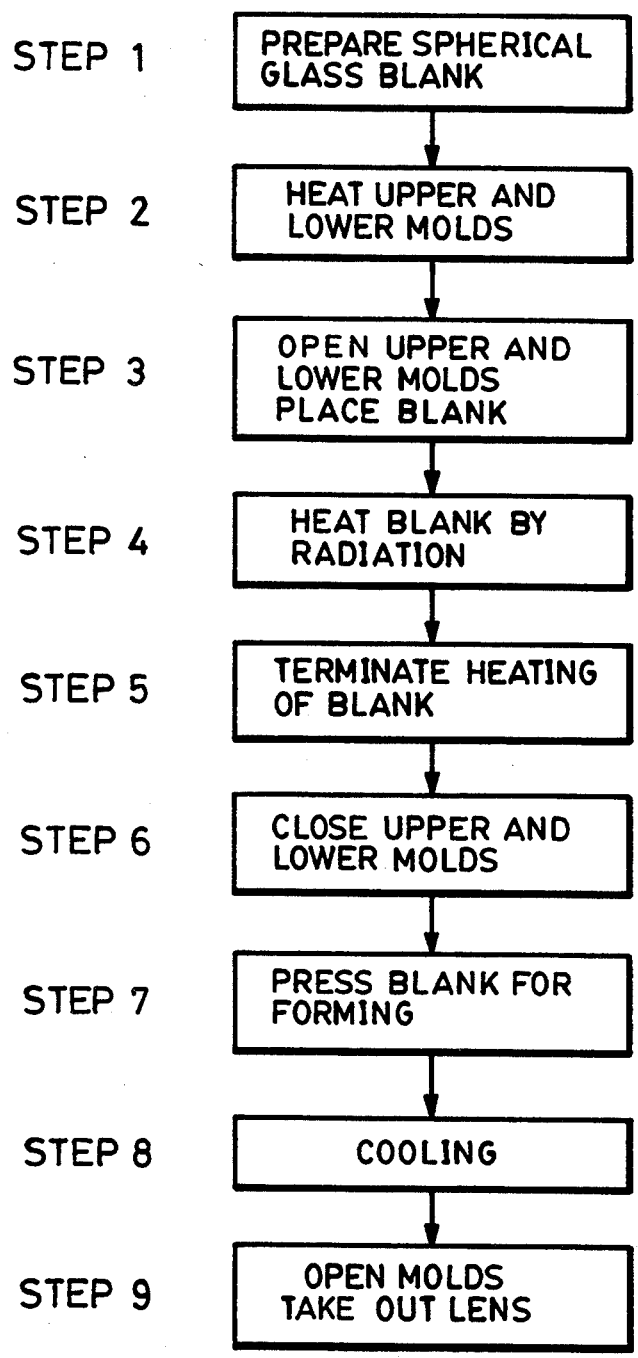
FIG. 1B is a flowchart of a forming process of the present invention.

FIG. 1B is a flowchart of the above-described forming process, and FIG. 1C shows the configuration of the apparatus for executing the process.

In the present embodiment, a spherical glass blank is first prepared as the glass material 5 (step 1). Subsequently, the upper and lower molds 1 and 2 are heated to a predetermined temperature by respective built-in heaters 40A under the control of a heater control means 40, and are controlled at the constant temperature according to signals from a temperature sensor 40B (step 2).

During or after the mold heating in the above-described step 2, the upper mold 1 is held at an opened position by a pressure cylinder 42, and the blank 5 is placed on the lower mold 2 (step 3). The blank 5 is carried in and taken out of the forming molds by an automatic hand (not shown). After the robot hand has completed carrying the blank 5 to the forming molds, a feed control means 44 for controlling the current supply for the radiation means 6 is turned on. Current is thereby supplied to the halogen lamp 6A which heats the blank 5 by radiation (step 4).

The feed control means 44 adjusts radiation energy by setting the value and time of current supply for the lamp 6A, determined in accordance with the forming conditions (softening temperature, forming temperature and the like) of the glass blank 5. When the heating by radiation has been performed during the time determined in accordance with the forming conditions of the glass blank 5, the feed control means 44 terminates its operation, whereby heating of the glass blank 5 is terminated (step 5).

When the operation of the feed control means 44 has been terminated, the upper mold 1 is lowered by the pressure cylinder 42 to close the forming molds (step 6). Subsequently, the pressure cylinder 42 presses the upper mold 1 so as to press the spherical glass blank 5 between the upper mold 1 and the lower mold 2. By lowering the upper mold 1 by a predetermined amount, the surfaces of the glass blank 5 are deformed so that respective forming surfaces 1a and 2a of the upper and lower molds 1 and 2 are transferred to the surfaces of the glass blank 5 to form an optical element (step 7).

Subsequently, the formed lens is cooled down to a predetermined temperature together with the molds by a cooling means 46 (46B and 46B) (step 8). After cooling the formed lens to the predetermined temperature, the molds are opened, and the formed lens is taken out by the automatic hand and is carried to a palette (not shown) or a carrying position (step 9).

A forming cycle is performed according to the above-described steps 1–9. The operations in the respective steps are controlled by a program of a forming control means 48.

Figure 2:
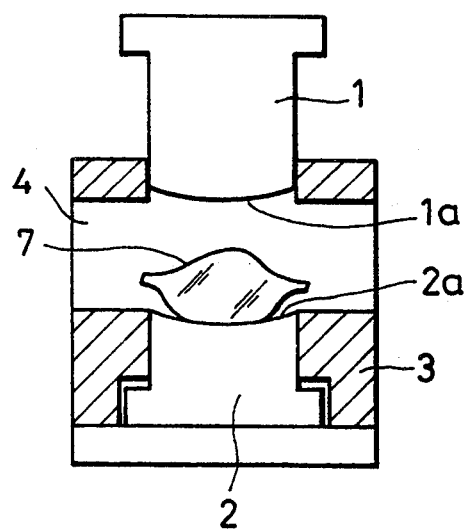
FIG. 2 is a vertical cross-sectional view of a mold structure according to a second embodiment of the present invention.

In a second embodiment shown in FIG. 2, a glass gob 7 is used as the glass material for press forming. In FIG. 2, a heating means for glass material is not illustrated.

In this embodiment, since the glass gob 7 is used as the glass material, the cost of the glass material is further reduced. Also in this case, the glass material can be easily formed by forming it after being heated on the lower mold 2 by radiation heat.

Figure 3:
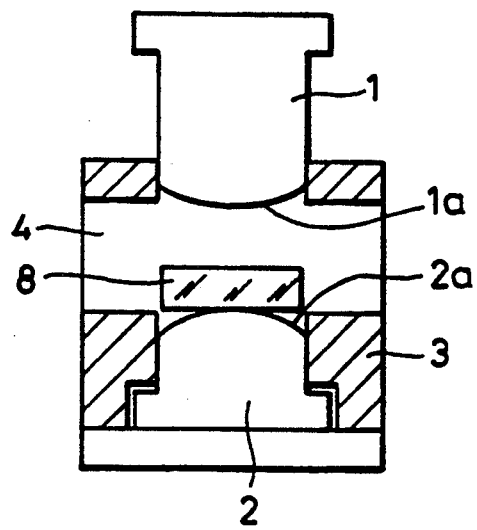
FIG. 3 is a vertical cross-sectional view of a mold structure according to a third embodiment of the present invention.

In a third embodiment shown in FIG. 3, a case of forming a convex lens as the optical element is illustrated. In this case, disk-like glass 8 is used as a glass material. Also in this case, the glass material can be easily formed by forming it after heating it on the lower mold 2 using radiation heat.

Figure 4:
FIG. 4 is a diagram illustrating the shape of a cross section of an aspherical lens formed in any of the above-described embodiments.
Figure 5:
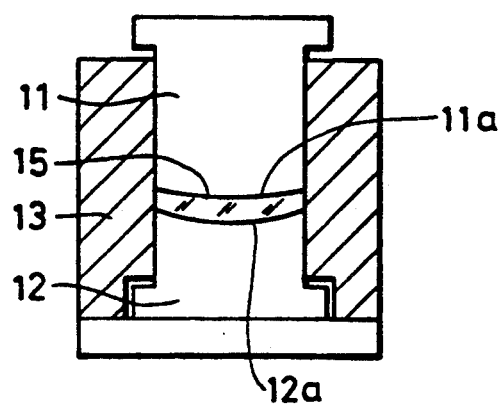
FIG. 5 is a vertical cross-sectional view illustrating a conventional approach.
Figure 6:
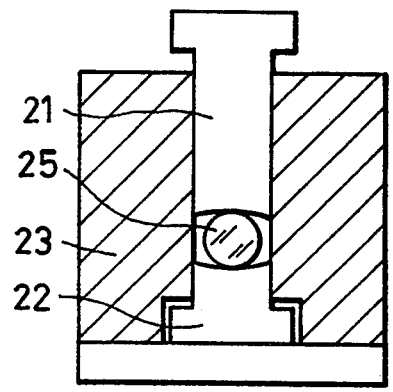
FIG. 6 is a vertical cross-sectional view illustrating another conventional approach.
Figure 7:
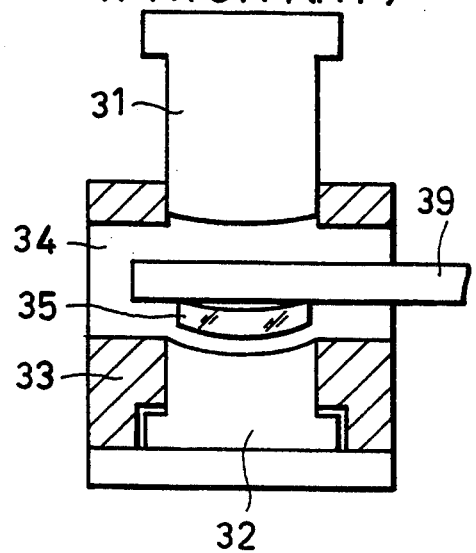
FIG. 7 is a vertical cross-sectional view illustrating still another conventional approach.
Figure 8:
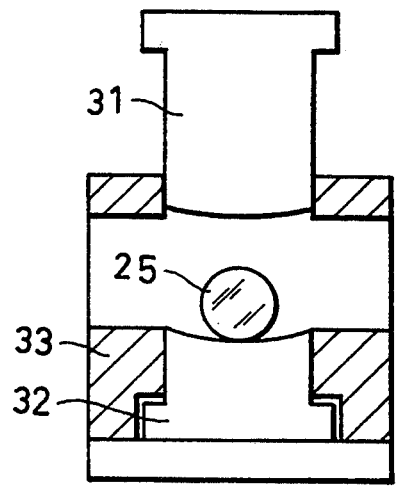
FIG. 8 is a vertical cross-sectional view illustrating yet another conventional approach.

By making at least one of the respective forming surfaces 1a and 2a of the upper and lower forming molds 1 and 2 aspherical, an aspherical lens as shown in FIG. 4 can be formed.

Although, in the above-described first embodiment, an explanation has been provided using a method where radiational heating of a glass blank located between molds 1 and 2 is performed by condensing infrared rays generated from a halogen lamp using a reflecting mirror, the method of performing radiation heating of a glass material is not limited to the above-described method. For example, a glass material may be subjected to radiation heating using a carbonic-acid-gas laser.

As explained above, according to the present invention, since a glass material is heated and softened by a heating means for glass material after being placed on a lower mold, and is then subjected to press forming, even a glass material having a simple shape where the heat transfer from the molds is poor may be formed in a short time. Hence, the cost of the glass material may be reduced. Furthermore, since the glass material is maintained at a higher temperature, it is possible to prevent the deformation of the forming surfaces of the molds even in repeated press forming operations.

Furthermore, according to the present invention, a forming method having an excellent energy efficiency can be obtained by providing a spherical glass blank as a glass material, and adopting a process of placing the spherical glass blank in forming molds and heating the blank by a radiation heat generating means. That is, by making the glass material spherical, the surface area can be reduced compared with a block-like or coin-like glass blank having the same volume. It is thereby possible to prevent heat transfer from the surface of a heated glass blank, and therefore the blank is heated to a predetermined forming temperature in a short amount of time.

The individual components shown in outline or designated by blocks in the drawings are all well-known in the optical element forming art and details of their specific construction and operation ape not necessary to an understanding of the invention.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims. The following claims are to be accorded a broad interpretation, so as to encompass all such modifications and equivalent structures and functions.

What is claimed is:

1. A method of forming an aspherical lens, said method comprising the steps of:
   providing upper and lower molds, where at least one of said molds has an optical forming surface that is aspherical;
   heating said upper and lower molds to a predetermined temperature;
   providing a glass blank, which is at a temperature lower than its forming temperature, on said lower mold with a conveying means;
   heating the glass blank to its forming temperature by exposing the glass blank to infrared radiation; and
   closing said upper and lower molds and pressing the glass blank to form an aspherical lens and gradually reducing the amount of infrared radiation to which the glass blank is exposed in accordance with the start of contact between said upper mold and the glass blank while maintaining the upper and lower molds at the predetermined temperature.

2. A method according to claim 1, wherein the infrared radiation is provided by a halogen lamp.

* * * * *

UNITED STATES PATENT AND TRADEMARK OFFICE
CERTIFICATE OF CORRECTION

PATENT NO. : 5,344,476
DATED : September 6, 1994
INVENTOR(S) : MASAYUKI TOMIDA

It is certified that error appears in the above-indentified patent and that said Letters Patent is hereby corrected as shown below:

COLUMN 1:

Line 17, "tipper" should read --upper--.

COLUMN 6:

Line 28, "ape" should read --are--.

Signed and Sealed this

Seventeenth Day of January, 1995

Attest:

BRUCE LEHMAN

Attesting Officer      Commissioner of Patents and Trademarks